United States Patent
Uehara

[19]

[11] Patent Number: 5,983,250
[45] Date of Patent: Nov. 9, 1999

[54] ARITHMETIC CIRCUIT FOR OBTAINING ABSOLUTE-VALUED DISTANCE

[75] Inventor: Teruaki Uehara, Tokyo, Japan

[73] Assignee: OKI Electric Industry Co., Ltd., Tokyo, Japan

[21] Appl. No.: 09/021,985

[22] Filed: Feb. 11, 1998

[30] Foreign Application Priority Data

May 26, 1997 [JP] Japan .................................... 9-135500

[51] Int. Cl.$^6$ ........................................................ G06F 7/00
[52] U.S. Cl. ........................................................ 708/201
[58] Field of Search .................................. 708/200, 201, 708/700, 714

[56] References Cited

U.S. PATENT DOCUMENTS

| | | | |
|---|---|---|---|
| 4,953,115 | 8/1990 | Kanoh ..................................... | 708/201 |
| 5,216,628 | 6/1993 | Mizutani et al. ........................ | 708/201 |
| 5,563,813 | 10/1996 | Chen et al. .............................. | 708/201 |

FOREIGN PATENT DOCUMENTS

| | | |
|---|---|---|
| 64-38831 | 2/1989 | Japan . |
| 7-64768 | 3/1995 | Japan . |
| 4-246722 | 9/1998 | Japan . |

*Primary Examiner*—Chuong Dinh Ngo
*Attorney, Agent, or Firm*—Rabin & Champagne, P.C.

[57] ABSTRACT

There is disclosed a compact arithmetic circuit for obtaining an absolute-valued distance (AVD) between two digital data. An inverter 11 generates the data * β which is derived from the data β as the 1's complement thereof. An ALU 12 adds the data α and the data * β when a carry data C1 is inputted thereto. An inverter 13 generates a new carry data C2 from the add result of the ALU 12 and feeds it back to the ALU 12. Each bit of the add result by the ALU 12 is inverted by an inverter 15 and is given to a selector 14. After the initial add operation, the ALU 12 adds the data α and the data * β by using carry data C2 as the input thereto. A selector 14 selects either the first add result by the ALU 12, the output data from the inverter 15 corresponding to the first add result, the second add result by the ALU 12, or the output data of the inverter 15 corresponding to the second add result, and outputs the selected as a correct AVD.

3 Claims, 4 Drawing Sheets

[ PRIOR ART ]

ARITHMETIC CIRCUIT FOR OBTAINING ABSOLUTE-VALUED DISTANCE

BACKGROUND OF THE INVENTION

The present invention relates to an arithmetic circuit which can be installed on a digital apparatus or the like, and execute high speed computation to obtain the absolute value of a distance between two input data (this distance is referred to as absolute-valued distance or is abbreviated to "AVD" hereinafter).

Recently, a variety of products which the digital processing is applied to, have been brought to market one after another. In general, for the digital processing in these products, a high speed functional unit is used to execute a high speed algorithm adopted by the product. Thus, this makes it possible to carry out a sophisticated process which can not be handled by the analog process. One of the most significant applications of the digital process is an adaptive control, which is inevitable for the process of controlling a digital telephone communication system or the like. In the typical adaptive control, a control quantity to control an object is determined in response to the magnitude of a difference (distance) between a value as estimated and a value as measured actually.

In case of computing a distance between a value as estimated and one measured actually, it is often required to compute an absolute-valued distance (AVD). Therefore, a processor for use in the digital processing, such as a Digital Signal Processor (DSP), is provided with the function capable of executing the AVD arithmetic command. This means that such processor includes a built-in AVD arithmetic circuit.

FIG. 2 is a structural view indicating an example of a conventional AVD arithmetic circuit. This AVD arithmetic circuit is a circuit for computing an absolute value of a difference $|\alpha-\beta|$ from a minuend data $\beta$, and subtrahend data $\beta$, both data being inputted to the circuit. This circuit is provided with an inverter 1 which generates the 1's (one's) complement * $\beta$ of the input data $\beta$, and an arithmetic logical unit (referred to as ALU hereinafter) 2 having the function as an adder. The inverter 1 acts to invert the value of respective bits of the data $\beta$ having a predetermined bit width. The output side of the inverter 1 is connected with one of two input ports of the ALU 2. The remaining input port of the ALU 2 is arranged the data $\alpha$ to be inputted thereto. The ALU 2 is arranged to receive not only data * $\beta$, $\alpha$ but also the data indicating of "1."

A selector 3 for selecting one of two data and a code inverting circuit 4 are arranged on the output side of the ALU 2. The input port of the code inverting circuit 4 is connected with the ALU 2 so as to receive the output data therefrom. The code inverting circuit 4 is constituted to include an inverter (not shown) which inverts each bit of the output data from the ALU 2, and a plurality of half adders (not shown), each one input terminal of which the value of each bit outputted from the above inverter is inputted to. These half adders are arranged to be connected with each other in such a manner that "1" is inputted to one half adder corresponding to the least significant bit (referred to as LSB hereinafter) and the carry data is sequentially inputted to other half adders from the low order bit side to the high order bit side. To the selector 3 are the output data from both of the ALU 2 and the code inverting circuit 4 inputted, and at the same time, the value of the most significant bit (referred to as MSB hereinafter) of the output data from the ALU 2 are inputted as a selection signal.

In the conventional AVD arithmetic circuit, the addition of data * $\beta$, $\alpha$ and data "1" i.e. $\alpha$+* $\beta$+1 is executed by using the function of the ALU 2 as the adder, namely ($\alpha$-$\beta$) is computed. The ALU 2 makes use of the MSB to indicate whether the data ($\alpha$-$\beta$) is positive or negative. The code inverting circuit 4 inverts the value of each bit of the resultant data ($\alpha$-$\beta$) computed by the ALU 2 and then adds "1" thereto. After this, it computes (-($\alpha$-$\beta$)). The selector 3 selects either data ($\alpha$-$\beta$) or (-($\alpha$-$\beta$)) based on the MSB of the output data from the ALU 2. When the MSB is "0" which means that the resultant data is positive, the selector 3 selects the data ($\alpha$-$\beta$). On the contrary, when the MSB is "1" which means that the resultant data is negative, the selector 3 selects the data (-($\alpha$-$\beta$)). In this way, $|\alpha-\beta|$ is computed.

SUMMARY OF THE INVENTION

However, the prior art AVD arithmetic circuit still includes such problems to be solved as described in the following items (a) through (c).

(a) The code inverting circuit 4 is provided in order to determine the AVD between data $\alpha$ and $\beta$. However, this circuit requires a plurality of half adders which are sequentially connected with each other. Therefore, this causes the circuit scale to be enlarged.

(b) The code inverting circuit 4 continues its operation even when the ALU 2 executes other arithmetic operation than that for computing the AVD, thus inviting unnecessary power consumption.

(c) When computing the AVD $|\alpha-\beta|$, it is needed to let the code inverting circuit 4 execute the code inverting operation in addition to the add operation by the ALU 2. Because of this, even if the ALU 2 is successfully provided with ability of performing the high speed add operation, this ability is limited by that of the code inverting circuit. Thus, this makes it difficult to realize an high speed AVD arithmetic circuit.

In short, these problems (a) through (c) are caused by providing the AVD arithmetic circuit with the code inverting circuit 4.

Accordingly, an object of the invention is to realize an AVD arithmetic circuit without utilizing any code inverting circuit. According to the first invention, in order to solve the above-mentioned problems, there is provided an AVD arithmetic circuit for obtaining the AVD between first and second digital data, wherein there are provided a complement generating circuit, an adder, a carry generating means, an inverter, and an output data selecting circuit.

The complement generating circuit generates the 1's complement of a first digital data. The adder adds the output data from the complement generating circuit to a second digital data when a carry data "0" or "1" is inputted to the least significant bit (LSB) of the add result, and outputs the add result, of which the most significant bit (MSB) is given a code "0" or "1" indicating that the add result is positive or negative. The carry generating means inverts the code of the MSB to generate a new carry data and feeds it back to the adder. The inverter inverts each bit value of the add result by the adder. The output data selecting circuit selects the data representing the absolute-valued distance (AVD) from either the first add result by the adder, the output data of the inverter which corresponds to the first add result, the second add result by the adder using a new carry data, or the output data of the inverter which corresponds to the second add result, based on the initial value of the code as well as on the code of the MSB of the first add result obtained in the first add operation by the adder.

In an AVD arithmetic circuit according to the second invention, there is further provided the following carry fixing means, in addition to constituents of the AVD arithmetic circuit according to the first invention.

This carry fixing means performs comparison between first and digital data, and fixes the carry data feedbacked by the carry generating means to "0" or "1" when first and second data are identical to each other.

In an AVD arithmetic circuit according to the third invention, the adder of the AVD arithmetic circuit according to the first invention is arranged as a multi-stage adder formed of multiple adder portions, and a carry fixing circuit is additionally provided therein.

Each of these multiple adder portions includes a first partial adder circuit which adds, assuming that the carry data inputted to the LSB is "0", the 1's complement of a first partial data having a predetermined bit width, which constitutes a part of the first digital data, to a second partial data having a predetermined bit width and corresponding to the first partial data, which constitutes a part of the second digital data: a second partial adder circuit which adds, assuming that the carry data inputted to the LSB is "1", the 1's complement of the first partial data to the second partial data; a partial selector which selects the output data from the first partial adder circuit when the carry data given from the preceding stage is "1", and selects the output data from the second partial adder circuit when the carry data given from the preceding stage is "0"; and a carry selecting means which selects the carry data outputted by the first or second partial circuit as selected by said partial selector, and outputs the selected carry data to the following stage side.

The carry fixing circuit fixes the carry data feedbacked by the carry generating means to "0" or "1" when all of carry data outputted from each of the first partial adder circuits in the multiple adder portions are "0" and all of carry data outputted from each of the second partial adder circuits in the multiple adder portions are "1."

In the AVD arithmetic circuits according to the first through the third inventions, when the first digital data β is a subtrahend and the second digital data α is a minuend, the data * β can be obtained as the 1's complement of the data β by the complement generating circuit. The carry generating means generates a carry and gives it to the adder. This adder executes the add operation when the carry data is inputted thereto. The carry generating means generates a new carry data based on MSB of the first add result obtained through the initial add operation by the adder. The inverter inverts each bit value of the first add result. In the initial add operation by the adder, the carry data generated by the carry generating means is not so stable that the carry data C would take a value "1" or "0." In other words, the first add result obtained through the initial add operation by the adder gives α+* β+1(=α−β) or α +* β+1(=α−β−1).

Needless to say, since the absolute-valued distance (AVD) to be finally determined is expressed in the form of |α−β|, if the value of (α−β) is positive, this value itself can be the AVD to be obtained. If, however, the value of (α−β) is negative, the AVD to be obtained is (−(α−β)). Thus, the adder performs another add operation using a new carry data to obtain the second add result, and then, the inverter inverts each bit value of the second add result. Accordingly, the AVD |α−β| to be obtained is to be either the first add result by the adder, the output data of the inverter which corresponds to the first add result, the second add result which is obtained by the adder using a new carry data, or the output data of the inverter which corresponds to the second add result. Thus, the output data selecting circuit selects one of the above four cases as the AVD |α−β| and outputs it.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

In the drawings.

PREFERRED EMBODIMENTS OF THE INVENTION

First Preferred Embodiment

Figure 1:
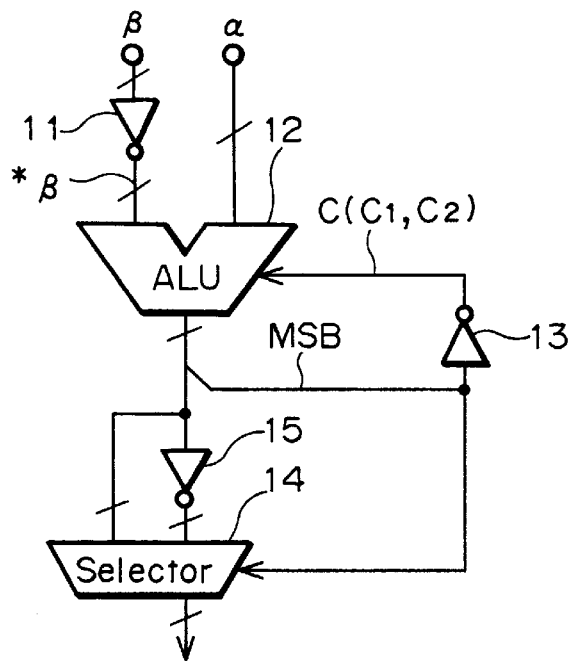
FIG. 1 is a block diagram schematically showing the structure of an AVD arithmetic circuit according to the first embodiment of the invention.
Figure 2:
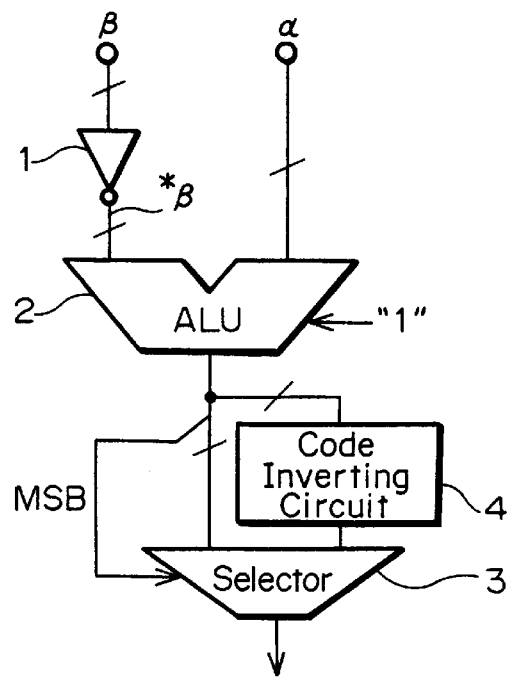
FIG. 2 is a block diagram schematically showing an example of the structure of a conventional AVD arithmetic circuit.

FIG. 1 is a block diagram schematically showing the structure of an AVD arithmetic circuit according to the first embodiment of the invention. This AVD arithmetic circuit is a circuit to which the first digital data β is inputted as a minuend and the second digital data α is inputted as a subtrahend, and then computes an absolute value of the difference therebetween i.e. |α−β|. The circuit is provided with an ALU 12 as an adder and an inverter 11 of the N-bit width as a complement generating circuit receiving the data β as its input to generate the 1's complement thereof i.e. data * β. The output side of the inverter 11 is connected with one of two input ports of the ALU 12. The other input port of the ALU 12 is arranged to receive the data α as an input data thereto. The ALU 12 is also arranged to receive a carry data C besides the data * β and α, this data C being supplied from an inverter 13 of one bit width which is provided as a carry generating means. The inverter 13 generates the carry data C by inverting the MSB of the output data from the ALU 12.

The output side of the ALU 12 are connected with a selector 14 operating as an output selection circuit and also with an inverter 15 of N-bit width. The output data of the ALU 12 is inputted to the N-bit width input port of the inverter 15. The selector 14 includes a register (not shown) which temporally holds the given data and outputs the data selected according to the algorithm as the AVD. The output data from the ALU 12 as well as from the inverter 15 are inputted to the selector 14, to which the value of MSB of the output data from the ALU 12 is further inputted.

In the following, the computation principle of the AVD by the AVD arithmetic circuit according to the first embodiment of the invention will be described comparing with the algorithm taken in the prior art AVD arithmetic circuit.

In the prior art AVD arithmetic circuit, the following expression (1) is computed by means of the adder function of the ALU 2. Subsequently, another expression (2) is computed by means of the code inverting circuit 4. That is:

$$\gamma = \alpha - \beta = \alpha +^* \beta + 1 \tag{1}$$

$$\delta = -\gamma = {}^*\gamma + 1 \quad (2)$$

where $*\gamma$ is 1's complement of $\gamma$.

Then, the value of the following expression (3) or (4) is outputted depending on whether the output $\gamma$ of the ALU 2 is positive or negative.

$$|\alpha - \beta| = \gamma, \gamma \geq 0 \quad (3)$$

$$|\alpha - \beta| = \delta, \gamma < 0 \quad (4)$$

In the AVD arithmetic circuit according to the first embodiment, the following expression (5) is computed by means of the adder function of the ALU 12.

$$\gamma: \alpha + {}^*\beta + C \quad (5)$$

where C is LSB i.e. the carry data

Then, the carry data C and the output data of the ALU 12 are changed according to the following expressions (6), (7), depending on whether the value of $\gamma$ outputted by the ALU 12 is positive or negative.

$$|\alpha - \beta| = \gamma; C = 1, \gamma \geq 0 \quad (6)$$

$$|\alpha - \beta| = \gamma; C = 0, \gamma < 0 \quad (7)$$

Next, the description will be made about the operation of the AVD arithmetic circuit as shown in FIG. 1.

The minuend data $\alpha$ is given in parallel to one input port of the ALU 12 while the subtrahend data $*\beta$ is inputted in parallel to the inverter 11, which in turn inverts the value of each bit of the inputted subtrahend data $\beta$ to produce the data $*\beta$ as the 1's complement of the data $\beta$. This data $*\beta$ is inputted in parallel to the other input port of the ALU 12. The MSB of an add result by the ALU 12 is inputted to the inverter 13, which in turn inverts it to determine a carry data C to be feedbacked to the LSB of the add result by the ALU 12. Receiving the carry data C, the ALU 12 executes computation of $\alpha + {}^*\beta + C$ therein. If the initial value C1 of the given carry data C is "0," this means that the ALU 12 computes $\gamma 1 + {}^*\beta + 0$ while if it is "1," this means that the ALU 12 computes $\gamma 1 = \alpha + {}^*\beta + 1$. The inverter 13 inverts the value of the MSB of the first add result $\gamma 1$ obtained through the first add operation, to produce a new carry data C2 and then returns it to the ALU 12.

The AVD $|\alpha - \beta|$ to be eventually obtained can be indicated by the following expression (8) or (9).

$$|\alpha - \beta| = \alpha - \beta, \alpha - \beta \geq 0 \quad (8)$$

$$|\alpha - \beta| = -(\alpha - \beta), \alpha - \beta < 0 \quad (9)$$

Accordingly, the ALU 12 adds the data $\alpha$ and $*\beta$ using the carry data C2 given from the inverter 13 as the carry input. Namely, ALU 12 computes $\gamma 2 = \alpha + {}^*\beta + C2$. The selector 14 selects and outputs the output data from the ALU 12 or the inverter 15 by utilizing the fact that the following expression (10) is always valid.

$$-A = {}^*A + 1$$

where A is an optical digital data, $*A$ represents the 1's complement of A

In the selective operation by the selector 14, if the MSB of the add result $\gamma 1$ is positive, either the add result $\gamma 1$ by the ALU 12 or the second add result $\gamma 2$ obtained through the add operation by ALU 12 based on the new carry data C2, is selected such that the selected add result corresponds to what is attained by computation of $\alpha + {}^*\beta + 1$. On the other hand, if the MSB of the addition result $\gamma 1$ is negative, either the output data of the invert 15 corresponding to the first add result $\gamma 1$ by the ALU 12 or the output data of the inverter 15 which corresponds to the second add result $\gamma 2$ obtained by using the new carry data C2, is selected such that the selected add result corresponds to what is attained by inverting the computation result of $\alpha + {}^*\beta + 0$. In this way, the absolute-valued distance can be determined by the above expressions (8) and (9).

Now, let us mathematically verify that a value attained through the AVD arithmetic circuit shown in FIG. 1 correctly represents the very AVD. Since the initial value of the carry data C1 varies, the verification will be carried out with regard to the following six conditions (i) through (vi).

(i) When $\alpha - \beta < 0$ and C1=0:

Under this condition, the output data $\gamma 1$ from the ALU 12 is expressed as:

$$\gamma 1 = \alpha + {}^*\beta + 0 = \alpha - \beta - 1$$

Since $\alpha - \beta > 0$, thus $\alpha - \beta - 1 \geq 0$, and the carry data is changed to be C2=1. Therefore, the add result $\gamma 2$ the ALU 12 outputs, is expressed as:

$$\gamma 2 = \alpha + {}^*\beta + 1 = \alpha - \beta$$

Accordingly, the correct AVD can be outputted when the selector 14 selects this value $\gamma 2$.

(ii) When $\alpha - \beta > 0$ and C1=1:

Under this condition, the output data $\gamma 1$ from the ALU 12 is expressed as:

$$\gamma 1 = \alpha + {}^*\beta + 1 = \alpha - \beta$$

Accordingly, the correct AVD can be outputted when the selector 14 selects this add result $\gamma 1$ by ALU 12.

(iii) When $\alpha - \beta = 0$ and C1=0:

Under this condition, the output data $\gamma 1$ from the ALU 12 is expressed as:

$$\gamma 1 = \alpha + {}^*\beta + 0 = \alpha - \beta - 1$$

Since $\alpha - \beta = 0$, thus $\gamma 1 = -1 < 0$, and the carry data can remain unchanged i.e. C2=0, accordingly. Thus, the add result $\gamma 2$ is:

$$\gamma 2 = \alpha + {}^*\beta + 0 = -1$$

Accordingly, if the selector 14 selects the output of the inverter 15 which corresponds to this value $\gamma 2$, it becomes possible to output the correct AVD $$INV(-1) = 0,$$

where INV represents inversion process by the inverter 15.

(iv) When $\alpha - \beta = 0$ and C1=1:

Under this condition, the output data $\gamma 1$ from the ALU 12 is expressed as:

$$\gamma 1 = \alpha + {}^*\beta + 1 = \alpha - \beta$$

Since $\alpha - \beta = 0$, thus $\gamma 1 = 0$, and the carry data can remain unchanged i.e. C2=1. Accordingly, the correct AVD can be outputted if the selector 14 selects this value $\gamma 1$ from the ALU 12.

(v) When $\alpha - \beta < 0$ and C1=0:

Under this condition, the output data $\gamma 1$ from the ALU 12 is expressed as:

$$\gamma 1 = \alpha + {}^*\beta + 0 = \alpha - \beta - 1$$

Since $\alpha-\beta<0$, thus $\gamma1<0$, and the carry data can remain unchanged i.e. C2=0. At this time, if the selector 14 selects the output data from the inverter 15, the correct AVD can be given as:

$$INV(\alpha-\beta-1)=-(\alpha-\beta-1)-1=-(\alpha-\beta)$$

(vi) When $\alpha-\beta<0$ and C1=1

Under this condition, the output data $\gamma1$ from the ALU 12 is expressed as:

$$\gamma1=\alpha+{}^*\beta+0=\alpha-\beta$$

Since $\alpha-\beta<0$, thus $\gamma1<0$, and the carry data is changed to be C2=0. Because of this, the add result $\gamma2$ of the ALU 12 is expressed as:

$$\gamma2=\alpha+{}^*\beta+0=\alpha-\beta-1$$

Since $\alpha-\beta<0$, thus $\gamma2<0$, and the carry data can remain unchanged i.e. C2=0. Accordingly, if the selector 14 selects the output data from the inverter 15, the correct AVD can be given as:

$$INV(\alpha-\beta-1)=-(\alpha-\beta-1)-1=-(\alpha-\beta)$$

As described in the above, in the AVD arithmetic circuit according to the first embodiment of the invention, there are provided the inverter 13 which generates the carry data C1, C2 and feeds them back to the ALU 12, and the inverter 15 which inverts each bit value of the add results $\gamma1$, $\gamma2$ of the ALU 12, thereby changing the add result output of the ALU 12 by using the carry data C2 corresponding to the add result $\gamma1$ being positive or negative. With this arrangement, the AVD can be obtained without any code inverting circuit 4 including a plurality of half adders associated with each other as used in the prior art AVD arithmetic circuit. Accordingly, the invention permits the scale of the AVD arithmetic circuit to be smaller and also permits the electric power consumption to be reduced.

Second Preferred Embodiment

Figure 3:
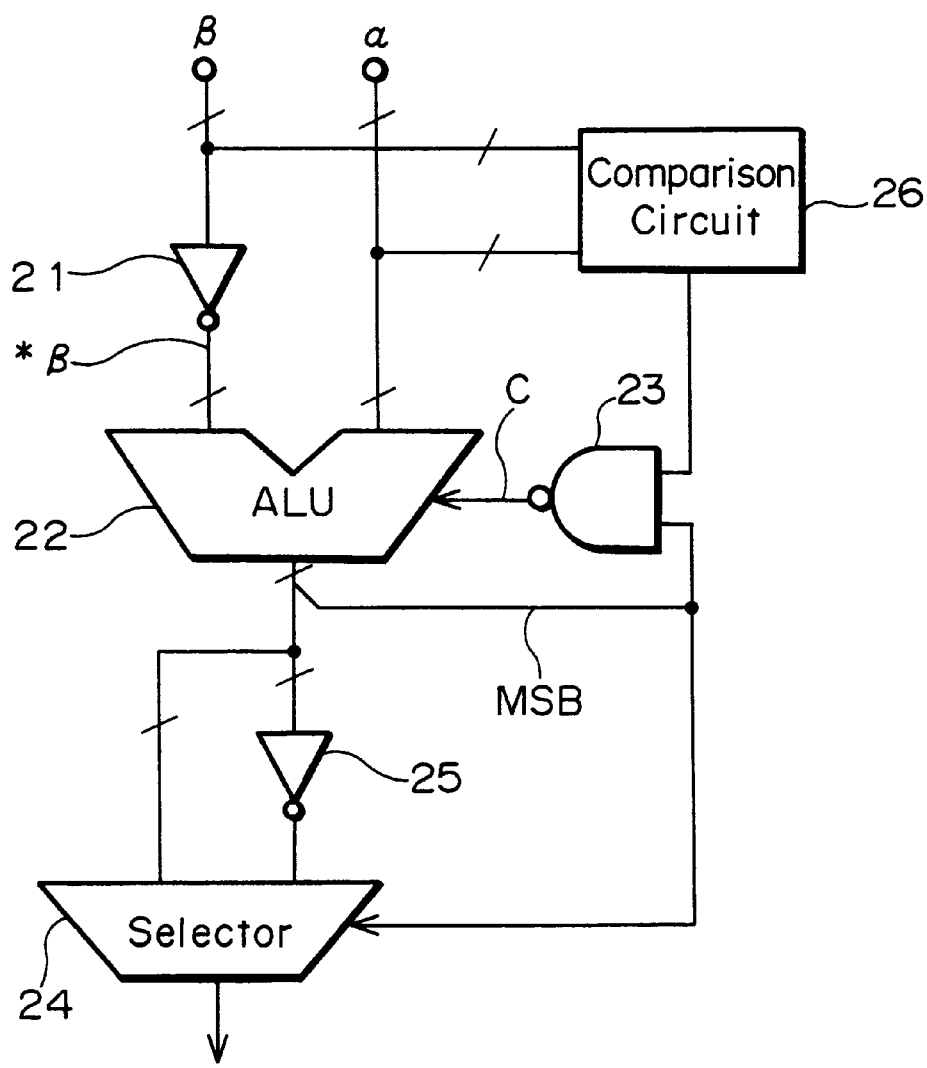
FIG. 3 is a block diagram schematically showing the structure of an AVD arithmetic circuit according to the second embodiment of the invention.

FIG. 3 is a structural illustration of the AVD arithmetic circuit according to the second preferred embodiment of the invention. This AVD arithmetic circuit includes, as the above-mentioned first embodiment does, an inverter 21 of an N-bit width which operates as a complement generating circuit for generating 1's complement of the input data $\beta$ i.e. data * $\beta$, and an ALU 22 which operates as an adder. The output side of the inverter 21 is connected with one of two input ports of the ALU 22. The other input port of the ALU 22 is arranged to receive the data $\alpha$ as the input thereto. The ALU 22 is arranged to receive, besides data $\alpha$ and * $\beta$, a carry data C from a NAND gate 23 which is provided as a carry generating means which is different from that which is described in connection with the first embodiment.

The output side of the ALU 22 is connected with a selector 24 which is an output data selecting circuit, and also with an inverter 25 of N-bit width. The selector 24 and the inverter 25 are identical to those which are adopted in the first embodiment as described in the above. The input port of N-bit width of the inverter 25 is arranged to receive the output data from the ALU 22 while the selector 24 is arranged to receive the output data from the ALU 22 as well as from the inverter 25. This selector 24 is arranged to receive the value of the MSB of the output data from the ALU 22 as a selective signal.

In this AVD arithmetic circuit, a comparison circuit 26 is further arranged as means for fixing the carry data. The comparison circuit 26 is provided with such function that it monitors respective values of data $\alpha$, $\beta$ and outputs "0" when both are equal to each other and outputs "1" when both are different from each other. The output terminal of the comparison circuit 26 is connected with one of input terminals of the NAND gate 23. The other output terminal of the NAND gate 23 is arranged to receive the MSB of the output data from the ALU 22.

Here, let us explain about the problem that might be caused in connection with the first embodiment.

In the first embodiment, the carry data C is made to vary depending on the MSB of the output from the ALU 12 (22). In other words, a feedback loop is formed by the MSB of the add result by the ALU 12(22) and the carry data C inputted to the LSB side of the add result by the ALU 12(22). As verified mathematically with respect to the first embodiment by taking account of the conditions (i) through (vi), if the add operation by the ALU 12(22) is executed in a moment, any influence will not be given to the add result by the ALU 12(22). Actually, however, the add operation by the ALU 12(22) can not be executed without spending any period of time. Therefore, there is possibility that vibration is caused in the value of the carry data C based on the period of time spent for the add operation. The vibration might be caused among others under the conditions (iii) and (iv) of the above six conditions. The mechanism causing the vibration will be explained according to an elapse of the operation time, for instance from time T0 (initial state) through time T2.

Assuming that the carry data C is "0" at T0, the ALU 12(22) will computes $\alpha+{}^*\beta=\alpha-\beta-1$. If, however, on the way of computation, the MSB becomes "0," the carry data C might change to "1".

Since the carry data C is "1" at T1, the ALU 12(22) computes $\alpha+{}^*\beta+1=\alpha-\beta$. If, however, on the way of computation, the MSB again might become "1", the carry data C then changes to "0".

Since the carry data C is "0" at T2, the ALU 12(22) computes $\alpha+{}^*\beta=\alpha-\beta-1$. If, however, on the way of computation, the MSB might become "0", the carry data C changes to "1".

As shown in the above, when $\alpha=\beta$, such vibration might be caused based on the add operation time taken by the ALU 12(22).

Next, there will be described the operation of the AVD arithmetic circuit as shown in FIG. 3.

When data $\alpha$ and $\beta$ are different from each other, the comparison circuit 26 outputs "1". With this output from the comparison, the NAND gate 23 generates the carry data C which is obtained by inverting the MSB of the output from the ALU 22, and this carry data c is feedbacked to the ALU 22. Accordingly, the ALU 22, the inverter 25, and the selector 24 operates to produce the correct AVD in the same manner as the circuit of the first embodiment as shown in FIG. 1.

When data $\alpha$ and $\beta$ are identical to each other, the comparison circuit 26 outputs "0." Therefore, the carry data C from the NAND gate 23 is fixed to "1," thereby preventing such vibration as has been seen in the first embodiment.

As described in the above, in the second embodiment, the comparison circuit 26 is provided in addition to the circuit according to the first embodiment. Further, the inverter 13 in the first embodiment is replaced by the NAND gate 23 in order to fix the carry data C when the data $\alpha$ is equal to the data $\beta$. Accordingly, with this arrangement, the possible vibration which might take place in the first embodiment can be prevented, thereby making it possible to obtain the correct AVD.

Third Preferred Embodiment

Figure 4:
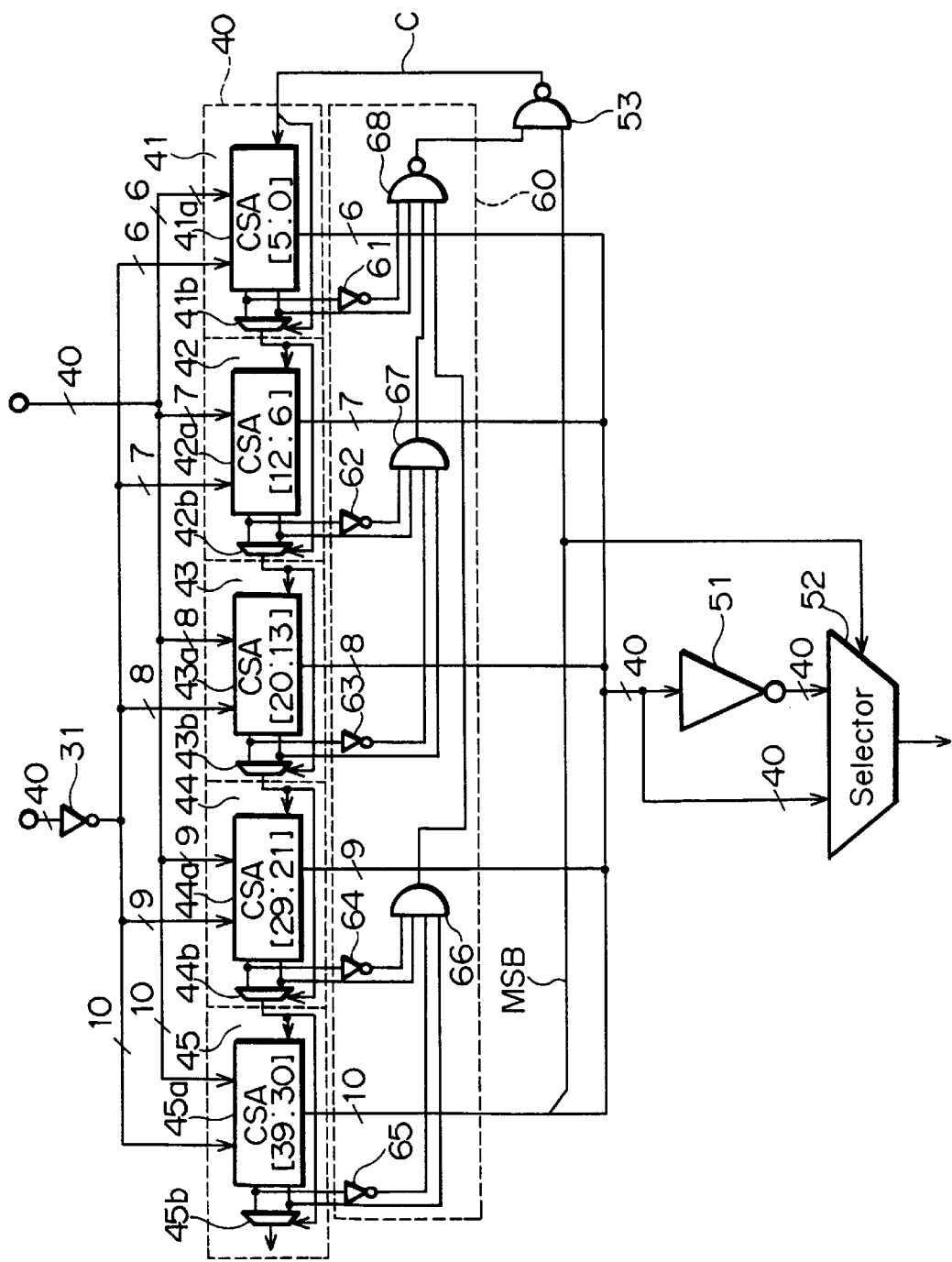
FIG. 4 is a block diagram schematically showing the structure of an AVD arithmetic circuit according to the third embodiment of the invention.

FIG. 4 is a structural illustration of the AVD arithmetic circuit according to the third preferred embodiment of the invention.

This AVD arithmetic circuit is a circuit for obtaining the AVD between data α and β, both having a predetermined bit width, for instance a 40-bit width. The circuit includes an inverter 31 with a 40-bit width which serves as a complement generating circuit; an ALU 40 which is a Carry Select Adder (CSA); an inverter 51 which is identical to that which is used in the first embodiment and is arranged on the output side of the ALU 40; a selector 52 which serves as an output selecting circuit; a NAND gate 53 serving as means for generating a carry data; and a carry data fixing circuit 60.

The ALU 40 is constituted as a multi-stage adder including a plurality of adder portions, in this instance, a 5-stage adder consisting of adder portions 41, 42, 43, 44, 45. Each of these adder portions 41–45 includes one each of CSA's 41a–45a and selectors 41b–45b as carry selecting means.

The adder portion 41 is arranged to execute the addition of 6-bit width by means of the CSA 41a. using the data inputted thereto i.e. the 0th to 5th bit of the complement data * β produced by the inverter 31 and the 0th to 5th bit of the data α. Other adder portions 42 through 45 are arranged to execute respective add operations in the similar manner, that is, the adder portion 42 executing the addition of 7-bit width by means of the CSA 42a, using the 6th to 12th bit of the complement data * β and the 6th to 12th bit of the data α; the adder portion 43 executing the addition of 8-bit width by means of the CSA 43a, using the 13th to the 20th bit of the complement data * β and the 13th to the 20th bit of the data α; the adder portion 44 executing the addition of 9-bit width by means of the CSA 44a, using the 21th to the 29th bit of the complement data * β and the 21th to the 29th bit of the data α; and the adder portion 45 executing the addition of 10-bit width by means of the CSA 45a, using the 30th to 39th bit of the complement data * β and the 30th to 39th bit of the data α.

The carry data C outputted from the NAND gate 53 is arranged to be inputted to the LSB of the add result by the adder portion 41. Each of adder portions 41 through 45 outputs its add result to the selector 52 and the inverter 51, and at the same time, outputs the respectively defined carry data to the adjacent adder portion on the high order side from selectors 41b through 45b (i.e. 41b to 42(42a;42b), 42b to 43(43a;43b), . . . etc.). Finally, the MSB of the add result by the adder portion 45 is inputted to one of input terminals of the NAND gate 53.

Figure 5:
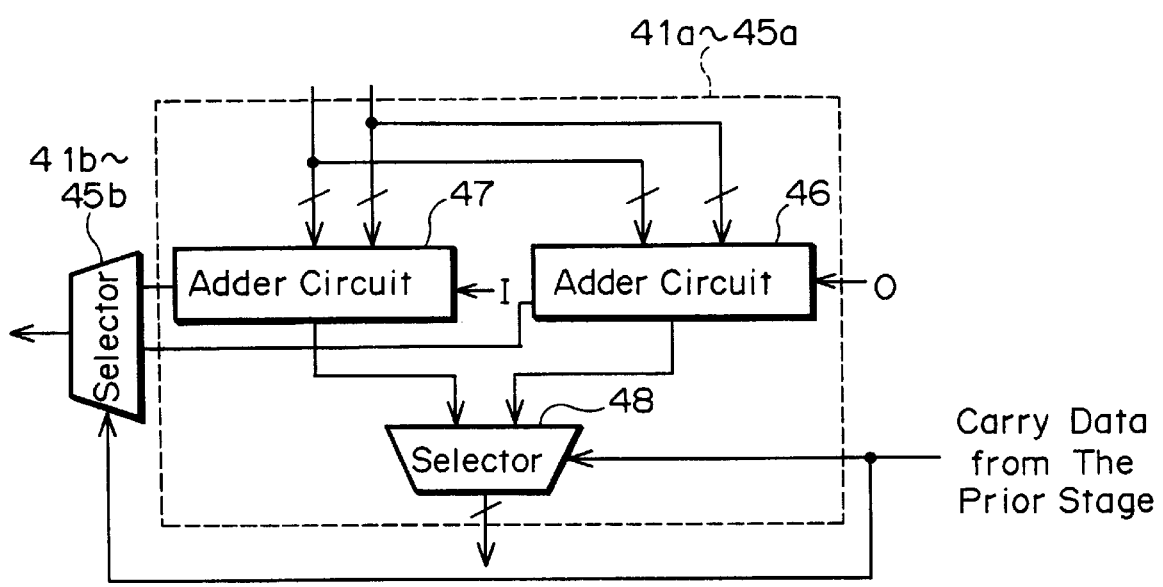
FIG. 5 is a block diagram schematically showing the structure of each of CSA's $41a$ through $45a$ indicated in FIG. 4.

FIG. 5 is a diagram schematically showing the structure of each of CSA's 41a through 45a as shown in FIG. 4.

Each of CSA's 41a through 45a includes a first partial adder circuit 46, a second partial adder circuit 47, and a partial selector 48 which selects the arithmetic result attained by the first and second partial adder circuits 46, 47. The first partial adder circuit 46 first operates to add two input data, assuming that the carry data C from the prior stage is "0." On the other hand, the second partial adder circuit 47 first operates to add two input data, assuming that the carry data C from the prior stage is "1." Each of partial add circuits 46, 47 can produce the carry data by itself and send it to respective selectors 41b through 45b.

The partial selector 48 selects the add result of the first partial adder circuit 46 when the carry data given from the preceding stage is "0" while it selects the add result of the second adder circuit 47 when the above carry data is "1." With this arrangement, the time for transmitting carry data becomes substantially equal to the delay time of the selector 41b through 45b, thereby enabling the arithmetic result to be output in high speed.

As shown in FIG. 4, a carry fixing circuit 60 includes five inverters 61, 62, 63, 64, and 65 of which each inverts the carry data outputted from the first partial adder circuit 46 in each of CSA's 41a through 45a; two 4-input AND gates 66, 67; and a 4-input NAND gate 68.

Two input terminals of the 4-input AND gate 66 are respectively connected with inverters 64 and 65 to receive the output data therefrom, and remaining two terminals thereof are respectively connected with the second partial adder circuit 47 of CSA's 44a and 45a to receive the carry data outputted therefrom. Two input terminals of the 4-input AND gate 67 are respectively connected with inverters 62 and 63 to receive output data therefrom, and remaining two terminals thereof are respectively connected with the second partial adder circuit 47 of CSA's 42a and 43a to receive the carry data outputted therefrom. Two input terminals of the 4-input NAND gate 68 are respectively connected with AND gates 66 and 67 to receive output data therefrom, and one of two remaining terminals is connected with the inverter 61 to receive the output data therefrom, and the other of the same is connected with the second partial adder circuit 47 of the CSA's 41 to receive the carry data outputted therefrom. The output terminal of the NAND gate 68 is connected with the other input terminal of the NAND gate 53.

In the next, the operation of the AVD arithmetic circuit as shown in FIG. 4 will be explained.

The data α is divided in a predetermined manner to be given to the first and second partial adder circuits 46, 47 of respective CSA 41a through 45a. On the other hand, the 1's complement of the data β i.e. * β is obtained by the inverter 31, and is divided in the same manner as the data α, to be given to the first and second partial adder circuits 46, 47 of respective CSA 41a through 45a. Respective first and second partial adder circuit 46, 47 of CSA's 41a through 45a executes the addition of data given thereto before the defined carry data is inputted from the preceding stage.

If, at this stage, the data α of 40-bit width is equal to the data β of 40-bit width, all the carry data outputted from each first partial adder circuit 46 of CSA's 41a through 45a become "0," and all the carry data outputted from each second partial adder circuit 47 of CSA's 41a through 45a become "1." For this, the data outputted from each of AND gates 66, 67 becomes "1" while the data outputted from the NAND gate 68 is fixed to "0." Namely, the carry data C given to the LSB of the ALU 40 is fixed to "1." Since the carry data C is fixed in this way, it becomes possible to eliminate the vibration as described in connection with the second embodiment.

If data α and β are different from each other, such condition as mentioned in the above, i.e. the condition that all the carry data outputted from each first partial adder circuit 46 of CSA's 41a through 45a are "0," and all the carry data outputted from each second partial adder circuit 47 of CSA's 41a through 45a are "1," can not be satisfied. Accordingly, the output data of NAND gate 68 becomes "1" while the NAND gate 53 generates the carry data C by inverting the MSB of the add result of CSA 45a and gives it to the LSB of the CSA 41a.

In the adder portion 41, the add result of either the first partial adder circuit 46 or the second one 47 of CSA'S 41a is selected based on the carry data C, and the carry data as defined at the selector 41b is outputted to the adder portion 42 located on the high order side. In other words, when the carry data C is "0," the selector 48 selects the add result of the first partial adder circuit 46, and the selector 41b selects the carry data which is outputted from the first partial adder circuit 46. On the contrary, when the carry data C is "1," the selector 48 selects the add result of the second partial adder circuit 47, and the selector 41b selects the carry data which is outputted from the second partial adder circuit 47. In each of the adder portions 42 through 45, the similar selection as taken in the adder portion 41 is executed based on the carry data respectively given from each of adder portions 41 through 44 located on the low order side.

The add result outputted from each of adder portions 41 through 45 is collected as an add result of 40-bit width and is then given to the inverter 51 and the selector 52, which in turn, takes the same selection step as in the first embodiment to output the correct AVD between the data $\alpha$ and $\beta$.

In the third embodiment as described in the above, there are provided the ALU 40 which is formed of a plurality of CSA's 41a through 45a and the carry fixing circuit 60, thereby having the selector 52 selected and outputted the AVD in the same manner as in the first embodiment. Therefore, the correct AVD can be obtained in high speed without encountering any undesirable vibration phenomenon. It is not special but rather general to make use of the CSA in order to enable the ALU 40 to operate in high speed, so that this will cause no increase in the circuit scale. Therefore, according to the invention, the AVD arithmetic circuit can be realized without using any code inverting circuit formed of plural half adders, so that it becomes possible to reduce the circuit scale and the unnecessary power consumption as well.

Here, it should be noted that the present invention is not limited to the embodiments as have been described in the above.

For instance, in the second embodiment, in order to prevent the vibration possibly caused when the data $\alpha$ is equal to the data $\beta$, the comparator 26 and the NAND gate 23 are provided to fix the carry data to "1." However, the vibration can be eliminated by constituting the circuit so as to fix the carry data to "0." Further, in the third embodiment, in order to prevent the vibration possibly caused when the data $\alpha$ is equal to the data $\beta$, the carry fixing circuit 60 and the NAND gate 53 are provided to fix the carry data to "1." However, the vibration can be eliminated by constituting the circuit so as to fix the carry data to "0."

As has been detailedly described in the above, according to the first to third inventions, there are provided a complement generating circuit which generates a 1's complement of the first digital data: an adder which executes an add operation using a carry data of "0" or "1" inputted thereto; a carry generating circuit which generates a carry data based on the MSB of the output data from the adder and feedbacks it to the adder; an inverter which inverts each bit of the add result of the adder: and an output data selecting circuit which selects and outputs an AVD based on the initial value of the MSB and the code of the first add result obtained by the initial add operation by the adder. Accordingly, the correct AVD can be computed without using the prior art code inverting circuit constituted with a plurality of half adders, thus enabling the circuit scale to be made compact and also enabling the unnecessary power consumption to be suppressed.

The entire disclosure of Japanese Patent Application No. 9-135500 filed on May 26, 1997 including specification, claims, drawings and summary is incorporated herein by reference in its entirety.

What is claimed is:

1. An arithmetic circuit for obtaining an absolute-valued distance (AVD) between a first digital data and a second digital data, comprising:

a complement generating circuit for obtaining the 1's complement of said first digital data:

an adder which adds the output data from said complement generating circuit to said second digital data when a carry data "0" or "1" is inputted to the least significant bit (LSB) of the add result, and outputs the add result, of which the most significant bit (MSB) is given a code "0" or "1" indicating that the add result is positive or negative;

a carry generating means which inverts the code of said MSB to generate said carry data and feeds it back to said adder;

an inverter which inverts each bit value of the add result by said adder;

an output data selecting circuit which selects the data representing said absolute-valued distance (AVD) from the first add result by said adder, the output data of said inverter which corresponds to said first add result, the second add result which is obtained by said adder, using a new carry data, or the output data of said inverter which corresponds to said second add result, based on the initial value of said code as well as on the code of the first add result obtained by the first add operation executed by said adder.

2. An arithmetic circuit as claimed in claim 1, further comprising a carry fixing means which performs comparison between said first digital data and said second digital data, and fixes said carry data as feedbacked by said carry generating means to "0" or "1" when said data $\alpha$ and $\beta$ are identical to each other.

3. An arithmetic circuit as claimed in claim 1, wherein said adder is arranged as a multi-stage adder including multiple adder portions, and there is further included a carry fixing circuit, each of said multiple adder portion including:

a first partial adder circuit which adds the 1's complement of a first partial data having a predetermined bit width, which constitutes a part of said first digital data, and a second partial data having a predetermined bit width and corresponding to said first partial data, which constitutes a part of said second digital data, assuming that the carry data inputted to the LSB is "0": a second partial adder circuit which adds said 1's complement of said first partial data and said second partial data, assuming that the carry data inputted to the LSB is "1":

a partial selector which selects the output data from said first partial adder circuit when the carry data given from the preceding stage is "0", and selects the output data from said second partial adder circuit when the carry data given from the preceding stage is "1"; and a carry selecting means which selects the carry data outputted by said first or second partial circuit as selected by said partial selector, and outputs the selected carry data to the following stage; and said carry fixing circuit fixing the carry data feedbacked by said carry generating means to "0" or "1" when all of carry data outputted from each of said first partial adder circuit in said multiple adder portions are "0" and all of carry data outputted from each of said second partial adder circuit in said multiple adder portions are "1."

* * * * *